United States Patent
Retze

(10) Patent No.: US 9,316,116 B2
(45) Date of Patent: Apr. 19, 2016

(54) METHOD AND DAMPING DEVICE FOR VIBRATION DAMPING OF A BLADE OF A TURBOMACHINE AS WELL AS TURBOMACHINE

(71) Applicant: MTU Aero Engines GmbH, Munich (DE)

(72) Inventor: Ulrich Retze, Eichenau (DE)

(73) Assignee: MTU AERO ENGINES GmbH, Munich (DE)

( * ) Notice: Subject to any disclaimer, the term of this patent is extended or adjusted under 35 U.S.C. 154(b) by 577 days.

(21) Appl. No.: 13/743,444

(22) Filed: Jan. 17, 2013

(65) Prior Publication Data
US 2013/0195611 A1  Aug. 1, 2013

(30) Foreign Application Priority Data

Jan. 25, 2012 (DE) .......................... 10 2012 201 048

(51) Int. Cl.
F01D 5/16 (2006.01)
F01D 25/06 (2006.01)
F04D 29/66 (2006.01)

(52) U.S. Cl.
CPC ...... F01D 25/06 (2013.01); F01D 5/16 (2013.01); F04D 29/668 (2013.01); F05D 2260/96 (2013.01); Y02T 50/672 (2013.01)

(58) Field of Classification Search
CPC ....... F01D 5/16; F01D 25/06; F05D 2260/96; F04D 29/668
See application file for complete search history.

(56) References Cited

U.S. PATENT DOCUMENTS

| | | | | |
|---|---|---|---|---|
| 5,052,529 A | * | 10/1991 | Sutcliffe | G05D 19/02 188/378 |
| 5,490,759 A | * | 2/1996 | Hoffman | F01D 5/26 415/10 |
| 5,709,527 A | * | 1/1998 | Ernst | F01D 5/26 415/10 |
| 6,827,551 B1 | | 12/2004 | Duffy et al. | |
| 8,568,088 B2 | * | 10/2013 | Richter | F01D 5/225 415/119 |

FOREIGN PATENT DOCUMENTS

| | | |
|---|---|---|
| DE | 102009032549 A1 | 1/2011 |
| DE | 102010051529 A1 | 5/2012 |
| WO | 2008000896 A1 | 1/2008 |

* cited by examiner

*Primary Examiner* — Ninh H Nguyen
(74) *Attorney, Agent, or Firm* — Barlow, Josephs & Holmes, Ltd.

(57) ABSTRACT

A method for vibration damping of at least one blade of a turbomachine, wherein initially at least one damping element is arranged on the blade such that it can move in the axial direction, employs a damping element having a larger permeability constant than the blade ($\mu_{rD} > \mu_{rB}$), and then a magnetic field acting in the radial direction is generated at least temporarily during rotation of a rotor hub of the turbomachine in order to adjust the mass of the damping element in real time. A damping device includes, for example, a ferromagnetic damping element as well as a magnetic field source, and a turbomachine.

11 Claims, 1 Drawing Sheet

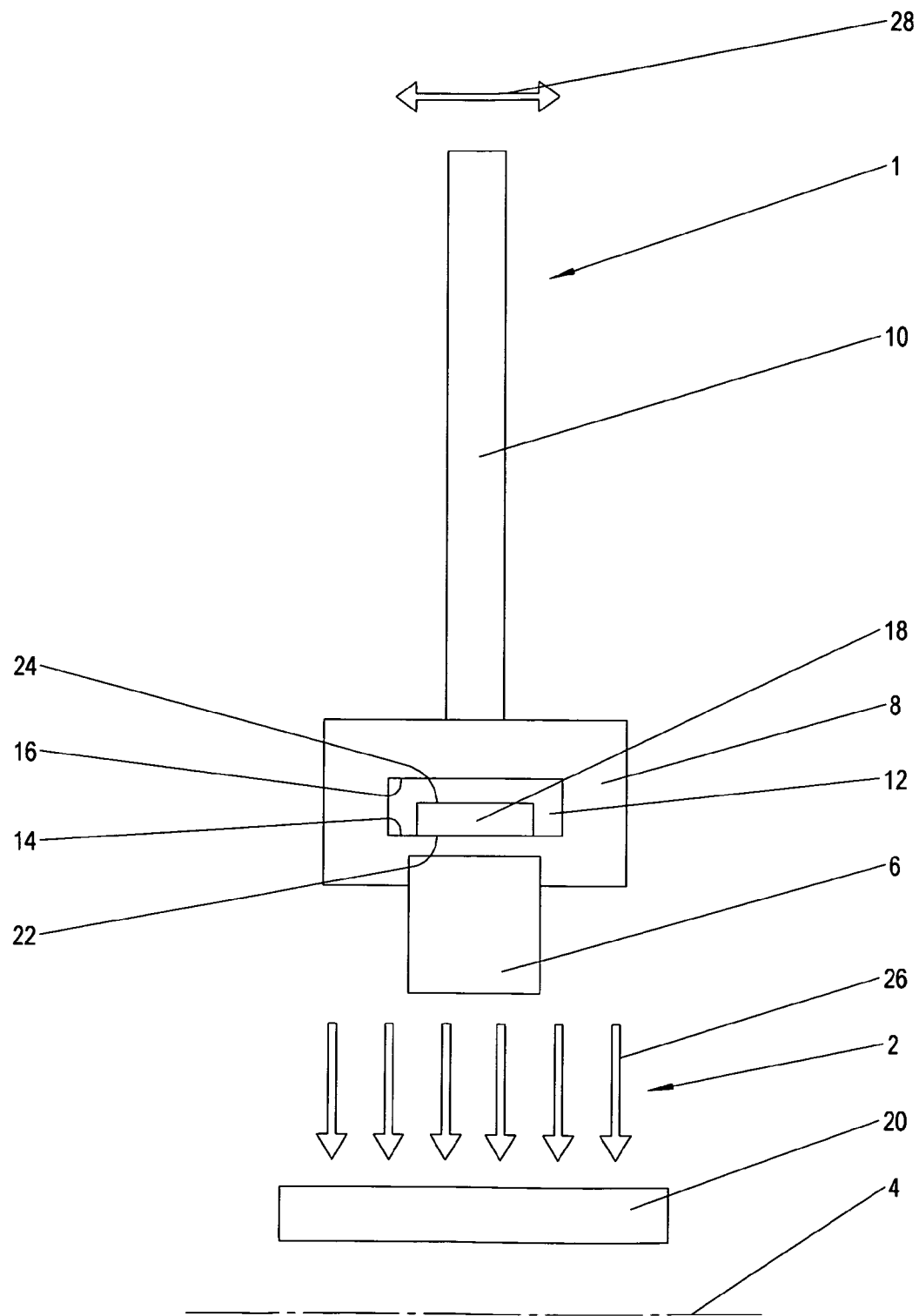

ue to the movement of the respective damping element, energy absorption due to friction also occurs in the guide blades when the method of the invention is employed; in contrast to the arrangement of the damping elements on running blades, this energy absorption is activated only when the magnetic field is activated.
METHOD AND DAMPING DEVICE FOR VIBRATION DAMPING OF A BLADE OF A TURBOMACHINE AS WELL AS TURBOMACHINE

BACKGROUND OF THE INVENTION

The invention relates to a method and a damping device for vibration damping of at least one blade of a turbomachine as well as a turbomachine with such a damping device.

Turbomachines, such as airplane engines, commonly have one or more damping devices for vibration damping of their blades. Thus, it is known from the patent DE 4 015 206 C1 to brace the running blades of a blade ring together through their shrouds. For this purpose, the shrouds have, for example, a Z-shaped design with two force-transmitting faces each for mutual mechanical coupling. Known from the patent EP 0 511 022 B1 is to brace the running blades of a blade ring together through a wire-like damping element, which is guided by its blade surfaces. Furthermore, it is known from the patent application EP 1 944 466 A1 to arrange damping elements in pockets of adjacent shrouds. When rotation of the rotor occurs, the damping elements move radially outward owing to centrifugal force and thereby bring about mechanical coupling of the shrouds. In addition, it is known to arrange damping elements in cavities on the blade neck side such that they can move in the axial direction. The damping effect is created owing to the action of friction between the damping element and the respective running blade. Often, however, the contact forces of the damping elements are too small at low speeds of rotation owing to their small mass to achieve an adequate damping effect.

BRIEF SUMMARY OF THE INVENTION

The object of the invention is to create a method for vibration damping or mistuning of at least one blade of turbomachine, said method eliminating the aforementioned drawbacks and enabling an improved damping action or mistuning of the at least one blade. Furthermore, the object of the invention is to create a damping device for effective vibration damping of at least one blade of a turbomachine as well as a turbomachine with improved vibrational behavior.

The object is achieved by a method with the steps of: arrangement of at least one damping element (18) at the blade (1) such that it can move in the axial direction, the damping element having a larger permeability constant ($\mu_{rD}$) than the blade (1); and generation of a magnetic field (26) acting in the radial direction at least temporarily during rotation of a rotor hub of a turbomachine. The object is also achieved by a damping device for vibration damping of at least one blade (1) with a smaller permeability constant ($\mu_{rB}$) of a turbomachine, comprising at least one damping element (18) with a larger permeability constant ($\mu_{rD}$) for arrangement at the blade (1) such that it can move in the axial direction and comprising at least one magnetic field source (20) for production of a contact force acting in the radial direction on the damping element (18). The object is also achieved by a turbomachine with a damping device (1) wherein the blades (1) of at least one row of blades are each provided with one of the damping elements (18) and a magnetic field (16) is arranged on the hub side or the casing side.

BRIEF DESCRIPTION OF THE DRAWING

FIG. 1 shows a vibration damping of a running blade according to the present invention.

DETAILED DESCRIPTION OF THE INVENTION

In the method according to the invention for vibration damping of at least one blade of a turbomachine, at least one damping element, which has a larger permeability constant than the blade, is initially arranged at the blade. A magnetic field acting at least temporarily in the radial direction is then generated during rotation of a rotor hub of the turbomachine.

The method according to the invention can be employed for damping or mistuning of both rotating blades and non-rotating blades. In accordance with the invention, the mass of the damping element is actively and, in particular, variably adjusted by the magnetic field. In the method according to the invention, the damping element does not have a defined mass, but rather the mass is altered in real time depending on the vibrational behavior or mistuning to be achieved. As a result of the fact that the at least one damping element has a larger permeability constant than the at least one blade, the damping element is more easily magnetized than the blade. The magnetic field virtually does not act on the blade. In this way, the magnetic field can act as far as the damping element, which, as a result, experiences a contact force acting in the radial direction. Because friction in the axial direction between the damping element and the blade is thus created or altered, the damping effect can be improved so as to prevent resonances at low speeds of rotation, for example. A vibration damping impulse effect of the damping element is thereby maintained. For guide blades, the circumference-related installation situation of the respective damping element can lead to different mechanisms of action of the damping elements owing to varying gravitational forces. This influence can be reduced to a minimum by means of the applied magnetic field. Besides impulse-like contacts due to the movement of the respective damping element, energy absorption due to friction also occurs in the guide blades when the method of the invention is employed; in contrast to the arrangement of the damping elements on running blades, this energy absorption is activated only when the magnetic field is activated.

The blades may be, for example, running or guide blades of an airplane engine that are arranged on the turbine side. These blades are made primarily of titanium or a titanium alloy and hence have a small permeability constant. The damping element, which is preferably made of a ferromagnetic material such as iron, has an appreciably larger permeability constant and hence an appreciably better magnetizability. In principle, it is also possible to achieve vibration damping of blading on the compressor side by means of the method according to the invention, but, in this case, it needs to be taken into consideration that the blading is generally based on a nickel alloy, which, in comparison to titanium, exhibits better magnetizability. Obviously, the method can be applied to both rotating and non-rotating plastic components or fiber composite components and particularly to rotor and propeller blades as well.

Preferably, the magnetic field can be switched on and off during rotation of the rotor hub. In this way, a damping effect can be created in critical ranges of speed by specific generation of the magnetic field, so that an optimized vibrational behavior is realized over the entire range of speed.

For further improvement of the damping effect, it is advantageous if the magnetic field strength can be varied as a function of the speed of rotation of a rotor hub. This means that, with increasing speed, the magnetic field is correspondingly strengthened.

In an embodiment, the magnetic field acts radially inward on the damping element. In this way, it is possible to counter the centrifugal force acting on the damping element when the at least one blade is designed as a running blade. If a blade surface facing the rotational axis functions as frictional surface, the centrifugal force and hence the frictional effect can be reduced. If a blade surface facing away from the rotational axis functions as frictional surface, the frictional effect can be increased.

In a preferred alternative embodiment, the magnetic field acts radially outward on the damping element. In this way, the centrifugal force acting on the damping element is increased by the contact force when the at least one blade is designed as a running blade. When the frictional surface of the at least one blade faces the rotational axis, the frictional effect can thus be increased. If a blade surface facing away from the rotational axis functions as frictional surface, the frictional effect can thus be decreased.

Particularly in the case when the at least one blade is a running blade and the magnetic field acts radially inward, it is advantageous if the magnetic field rotates together with the rotational movement of the at least one damping element. For example, the magnetic field source can be arranged on the hub side. In this way, a magnetic field source can be positioned both close to the damping element and also close to the axis of rotation in order to produce a magnetic field. As a result of the fact that the magnetic field strength is positioned close to the damping element, the latter can be designed with reduced performance. As a result of the fact that the magnetic field is positioned close to the axis of rotation, any influence of the magnetic field source mass on the rotational behavior of the rotor hub or of the rotor can be kept small.

Alternatively, the magnetic field can be fixed in position or designed to be stationary. Depending on the size of the magnetic field, there ensues either a local, temporary application of the magnetic field to the damping elements or else a continuous application. Continuous application is preferred, because, in this way, a constant contact force can be adjusted and fluctuations in the contact force resulting from the repeated buildup and decay of a magnetic field can be prevented. For example, a magnetic field source can be arranged on the stator side in a turbomachine and thus envelop the running blades or guide blades to be damped.

If the at least one blade is mounted in a blade mount subject to tolerances, it is advantageous if the damping element is arranged close to the blade mount, because it is stabilized by bracing in this way.

A damping device according to the invention for vibration damping of at least one turbomachine blade with a small permeability constant has at least one damping element with a large permeability constant for arrangement at the blade such that it can move in the axial direction and at least one magnetic field source for producing a contact force acting in the radial direction on the damping element. Such a damping device enables the method according to the invention to be implemented and hence it enables an effective vibration damping. When ferromagnetic frictional dampers are used as damping elements, their efficiency can be significantly increased.

In an embodiment, the magnetic field is a ring magnet. The ring magnet can be segmented so as to simplify mounting. It can be designed as an electromagnet or as a permanent magnet. The design of the ring magnet as a permanent magnet has the advantage that no current flow is required for vibration damping, thereby further simplifying mounting and installation of the damping device.

A preferred turbomachine has a damping device according to the invention wherein blades of at least one row of blades are each provided with a damping element and a magnetic field source is arranged on the hub side or on the casing side.

Such a turbomachine exhibits optimized vibrational behavior in comparison to conventional turbomachines.

Other advantageous exemplary embodiments of the invention are the subject of the dependent claims.

In the following, an exemplary embodiment of the invention will be discussed in detail on the basis of a strongly simplified schematic illustration. The sole FIG. 1 shows an exemplary embodiment of a vibration damping device according to the invention.

In FIG. 1, vibration damping of a running blade 1 according to the invention is shown by means of vibration damping device 2 according to the invention. The running blade 1 is, for example, a running blade of a turbine-side row of running blades of a turbomachine, such as an airplane engine. The running blade 1 is representative of all running blades of a row of running blades and is arranged on a rotor hub (not shown) that rotates around an axis of rotation 4.

The running blade 1 is made of a material with a small permeability constant $\mu_{rB}$ and is accordingly only very weakly magnetized. An exemplary material is titanium or a titanium alloy. The running blade 1 has a foot 6 for arrangement in a mount at a hub, a neck 8, and a blade surface 10, which is arranged in an annulus through which a main current passes. For compensation of thermal expansions, the blade foot 6 and thus the running blade 1 is arranged in a mount subject to tolerances. That is, in its cold state, the running blade 1 can make small movements in the mount. Formed in the blade neck 8 is a cavity 12 with a square cross section, which has an radially inner-lying flat bottom face 14 facing away from the axis of rotation 4 and a radially outer-lying flat cover face 16 facing the axis of rotation 4.

The damping device 2 has a damping element 18 as well as at least one magnetic field source 20.

The damping element 18 can move in the axial direction in the cavity 12 and is thus arranged close to the running blade mount. Preferably, it has a square cross section with a flat base 24 facing the bottom face 14 and a surface 26 facing the cover face 16. It is preferably made of a material with a large permeability constant $\mu_{rD}$ and thus exhibits an improved magnetizability compared to the running blade 1. For example, the damping element 18 is made of a ferromagnetic material like iron.

The magnetic field source 20 functions to produce a magnetic field 26 that acts in the radial direction on the damping element 16. It is for example an electromagnet designed as a ring magnet, which is divided into individual ring segments in order to facilitate mounting. It is inserted in a mount of the hub and thus mounted so as to rotate together with the row of running blades. The magnetic field 20 is arranged radially inner-lying with respect to the damping element 18 for exposure of the damping element 18 to a contact force that is directed oppositely to the centrifugal force acting on the damping element 18 during rotation.

In the following, a preferred method of the invention will be discussed in detail. For example, the damping device 2 is provided in an airplane engine for vibration damping of the running blades 1 of a row of running blades. The running blades 1 are inserted into mounts of a hub subject to tolerances and each is provided with one damping element 18. Arranged radially inner-lying with respect to the damping elements 18 is a magnetic field source 16 designed as a ring magnet through which current can flow.

When the hub 4 rotates, the running blades 1 are each set in vibration in the axial direction according to the double arrow 28. The damping elements 18 are accelerated radially outward owing to centrifugal force and their surfaces 24 start to rub along the cover faces 16, which accordingly function as blade-side frictional surfaces. On account of the low mass of the damping elements 18, however, they are exposed to only a small centrifugal force, so that only a limited damping effect is achieved. For improvement of the frictional effect and hence of the damping effect, the damping elements 18 are exposed to a radially inward-directed contact force, at least at low speeds of rotation. To this end, current flows through the magnetic field source 16. The magnetic field source 16 produces a magnetic field 26, which, owing to the small permeability constant $\mu_{rB}$ or the running blades 1 virtually acts only on the damping elements 18. They are now pulled or moved radially inward and thus, counter to centrifugal force, the bases 22 thereof press against the bottom faces 20, which now function as blade-side frictional surfaces. The frictional effect increases and the damping effect is improved. With increasing speed of rotation, the magnetic field strength is corresponding adapted so that a frictional effect between the bases 22 and the bottom faces 14 is in principle possible in opposition to centrifugal force even at high speeds of rotation. In particular, the magnetic field 26 is generated if, in critical ranges of rotational speed, the turbomachine needs to alter the vibrational behavior of the running blades 1 or bring about a damping effect. Once the critical range of rotational speed is passed, the magnetic field source 20 is switched off, the magnetic field 26 collapses, and the damping elements 18 are accelerated radially outward against the cover faces 16 owing to centrifugal force.

In a variant of the method according to the invention, in which the magnetic field 26 also acts counter to centrifugal force, the magnetic field 26 is adjusted such that, although the damping elements 18 rub against the cover faces 16, the frictional effect is reduced owing to the magnetic field 26. Obviously, the two aforementioned variants of the method may be combined.

In another variant of the method according to the invention, the magnetic field 26 is employed to support or enhance the centrifugal force. The magnetic field source 20 is on the stator side and hence arranged in a fixed position. In particular, it is arranged radially outer-lying with respect to the damping elements 18. In this way, the damping elements 18 are pulled or pressed against the cover face 16 of the cavity 12 when current flows through the magnetic field source 20 and, as a result, the vibrational behavior of the running blades 1 is also influenced.

The position of the damping element 18 at the running blade 1 or a guide blade is in principle free. Thus, the damping element 18 can be arranged close to the axis of rotation, as described above. Alternatively, however, it can also be mounted at the blade 1 remote from the axis of rotation, for example at a free segment of body of the blade 1. In addition, the damping element 16 can also be fixed in position to a blade segment that can vibrate, with application of the magnetic field 26 to the damping element 18 resulting in stabilization of the blade segment that can vibrate, which, in turn, affects the vibrational behavior of the entire blade 1.

It is further mentioned that, in the case of a blade 1 made of different materials, the permeability constant ($\mu_{rB}$) of the blade 1 relates to the blade segment at which the damping element 18 is arranged.

Disclosed are a method for vibration damping of at least one blade of a turbomachine, wherein initially at least one damping element is arranged on the blade such that it can move in the axial direction, said damping element having a larger permeability constant than the blade ($\mu_{rD} > \mu_{rB}$), and then a magnetic field acting in the radial direction is generated at least temporarily during rotation of a rotor hub of the turbomachine in order to adjust the mass of the damping element in real time, a damping device with, for example, a ferromagnetic damping element as well as a magnetic field source, and a turbomachine.

The invention claimed is:

1. A method for vibration damping of at least one blade (1) of a turbomachine, the turbomachine having an axial direction and a radial direction, the method comprising the steps:
   providing at least one blade, each blade having a respective blade cavity defined in the respective blade, the cavity comprising a first cavity face;
   providing at least one damping element (18);
   placing the at least one damping element (18) in the cavity of one of the at least one blades (1) such that it can move in the axial direction, said damping element having a larger permeability constant ($\mu_{rD}$) than the blade (1), said damping element comprising a first surface; and
   generating a magnetic field (26) acting in the radial direction at least temporarily during rotation of a rotor hub of a turbomachine to move the at least one damping element in the radial direction within the cavity, thereby creating an adjustable contact force between the first cavity face and the first surface.

2. The method according to claim 1, wherein the magnetic field (26) is switched on and off during the rotation.

3. The method according to claim 1, wherein a magnetic field strength is varied as a function of the speed of rotation of the rotor hub.

4. The method according to claim 1, wherein the magnetic field (26) acts radially inward on the damping element (18).

5. The method according to claim 1, wherein the magnetic field (26) acts radially outward on the damping element (18).

6. The method according to claim 1, wherein the magnetic field (26) rotates together with the damping element (18).

7. The method according to claim 1, wherein the magnetic field (26) is fixed in position.

8. The method according to claim 1, wherein the damping element (18) is placed close to a blade mount when the blade (1) is braced in a blade mount subject to tolerances.

9. A damping device (2) for vibration damping of at least one blade (1) with a smaller permeability constant ($\mu_{rB}$) of a turbomachine having an axial direction and a radial direction, the damping device comprising at least one damping element (18) with a larger permeability constant ($\mu_{rD}$) for placement in a cavity defined within one of the at least one blades (1) such that it can move in the axial direction and comprising at least one magnetic field source (20) for production of a contact force acting in the radial direction on the damping element (18) at an interface between a first cavity face and a first surface of the damping element.

10. The damping device according to claim 9, wherein the magnetic field (20) is a ring magnet.

11. A turbomachine with a damping device (1) according to claim 9, wherein the blades (1) of at least one row of blades are each provided with one of the damping elements (18) and a magnetic field (16) is arranged in the rotor hub or in a casing of the turbomachine.

* * * * *